(12) United States Patent
Shaffer et al.

(10) Patent No.: US 7,702,792 B2
(45) Date of Patent: Apr. 20, 2010

(54) METHOD AND SYSTEM FOR MANAGING COMMUNICATION SESSIONS BETWEEN A TEXT-BASED AND A VOICE-BASED CLIENT

(75) Inventors: Shmuel Shaffer, Palo Alto, CA (US); Labhesh Patel, Mountain View, CA (US); Johnny Hsienchow Lee, Mountain View, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/754,734

(22) Filed: Jan. 8, 2004

(65) Prior Publication Data

US 2005/0198096 A1    Sep. 8, 2005

(51) Int. Cl.
*G06F 15/16* (2006.01)
*H04M 1/64* (2006.01)
*H04M 3/42* (2006.01)

(52) U.S. Cl. .................. 709/227; 379/88.23; 379/201.1
(58) Field of Classification Search ................. 709/200, 709/227; 370/352; 379/88.12, 88.14, 88.13, 379/88.23, 201.1
See application file for complete search history.

(56) References Cited

U.S. PATENT DOCUMENTS

| | | | | |
|---|---|---|---|---|
| 5,982,774 | A | 11/1999 | Foladare et al. | 370/401 |
| 5,995,590 | A * | 11/1999 | Brunet et al. | 379/52 |
| 6,301,339 | B1 * | 10/2001 | Staples et al. | 379/93.01 |
| 6,430,602 | B1 | 8/2002 | Kay et al. | 709/206 |
| 6,434,599 | B1 | 8/2002 | Porter | 709/204 |
| 6,438,222 | B1 | 8/2002 | Burg | 379/215.01 |
| 6,442,242 | B1 | 8/2002 | McAllister et al. | 379/67.1 |
| 6,463,142 | B1 | 10/2002 | Kilp | 379/201.06 |
| 6,466,909 | B1 | 10/2002 | Didcock | 704/260 |
| 6,654,603 | B1 * | 11/2003 | Chow et al. | 455/414.1 |
| 7,254,226 | B1 * | 8/2007 | Roberts et al. | 379/215.01 |
| 7,317,908 | B1 * | 1/2008 | Eason | 455/413 |
| 2002/0067806 | A1 * | 6/2002 | Rodriguez et al. | 379/88.12 |

(Continued)

FOREIGN PATENT DOCUMENTS

EP    1 324 580 A2    7/2003

(Continued)

OTHER PUBLICATIONS

U.S. Appl. No. 09/511,082, filed Feb. 23, 2000, entitled "*System and Method for Securing Voice Mail Messages*," inventors are Jeffrey A. Sanders et al.

(Continued)

*Primary Examiner*—Nathan Flynn
*Assistant Examiner*—Chirag R Patel
(74) *Attorney, Agent, or Firm*—Baker Botts L.L.P.

(57) ABSTRACT

A system and method for communicating messages includes receiving, from a first client associated with a calling party, a request for connection with a second client. A called party associated with the second client is notified that the request for connection was received, in response to receiving the request for connection. A connection processing instruction may be received from a third client associated with the called party. In accordance with a particular embodiment of the present invention, the request for connection may be processed in accordance with the connection processing instruction.

49 Claims, 1 Drawing Sheet

U.S. PATENT DOCUMENTS

| | | | |
|---|---|---|---|
| 2002/0080776 A1 | 6/2002 | Norris et al. | 370/352 |
| 2002/0083127 A1* | 6/2002 | Agrawal | 709/203 |
| 2002/0181398 A1 | 12/2002 | Szlam | 370/230 |
| 2003/0027555 A1* | 2/2003 | Malackowski et al. | 455/414 |
| 2003/0206551 A1 | 11/2003 | Naim et al. | 370/401 |
| 2004/0002932 A1* | 1/2004 | Horvitz et al. | 706/46 |
| 2004/0006623 A1* | 1/2004 | Gourraud et al. | 709/227 |
| 2004/0037266 A1* | 2/2004 | Roberts et al. | 370/352 |
| 2004/0057562 A1* | 3/2004 | Myers et al. | 379/88.14 |
| 2004/0062365 A1* | 4/2004 | Agraharam et al. | 379/88.14 |
| 2004/0122901 A1* | 6/2004 | Sylvain | 709/206 |
| 2004/0151284 A1* | 8/2004 | Adamczyk | 379/88.13 |
| 2005/0013419 A1* | 1/2005 | Pelaez et al. | 379/88.14 |
| 2005/0111631 A1* | 5/2005 | Jordan, Jr. | 379/88.12 |

FOREIGN PATENT DOCUMENTS

WO     WO 02/093889 A1     11/2002

OTHER PUBLICATIONS

U.S. Appl. No. 10/288,679, filed Nov. 4, 2002, entitled "*System and Method For Communicating Messages Between a Text-Based Client and a Voice-Based Clien,t*" inventors are Aaron J. Belcher et al.

U.S. Appl. No. 10/649,452, filed Aug. 25, 2003, entitled "*Method and System for Managing Calls of An Automatic Call Distributor*," inventors are Shmuel Shaffer, et al.

UK Intellectual Property Office; Patents Act 1977: Examination Report under Section 18(3); Application No. GB0613490.2, Aug. 11, 2008.

Office Action issued by the Canadian Intellectual Property Office; Application No. 2,551,568; File No. T8470099CA; Mar. 31, 2009.

\* cited by examiner

METHOD AND SYSTEM FOR MANAGING COMMUNICATION SESSIONS BETWEEN A TEXT-BASED AND A VOICE-BASED CLIENT

TECHNICAL FIELD OF THE INVENTION

This invention relates in general to network communications and, more particularly, to a method and system for managing communication sessions between a text-based client and a voice-based client.

BACKGROUND OF THE INVENTION

Voice messaging is widely used in the business community to record messages from people trying to contact others that are not available. This modality enables people to communicate from any POTS or simple IP phone. Instant messaging (IM) allows people to communicate with others while being on a computer or a hand-held device connected to a network. This gives them the benefit of mobility while being able to stay in touch with others.

SUMMARY OF THE INVENTION

The present invention provides a method and system for managing communication sessions between a text-based client and a voice-based client, that substantially eliminates or reduces at least some of the disadvantages and problems associated with previous methods and systems.

In accordance with a particular embodiment of the present invention, a method for communicating messages includes receiving, from a first client associated with a calling party, a request for connection with a second client. A called party associated with the second client is notified that the request for connection was received, in response to receiving the request for connection. A connection processing instruction may be received from a third client associated with the called party. In accordance with a particular embodiment, the request for connection may be processed in accordance with the connection processing instruction.

In accordance with another embodiment of the present invention, the connection processing instruction may include an instruction from the called party to transfer the calling party to a voicemail messaging system associated with the called party. In an alternative embodiment, the connection processing instruction may include and instruction from the called party to establish a communication channel between the first client and the third client. The communication channel may include a two-way voice communication path between the first client and the third client. Alternatively, the communication channel may comprise a hybrid voice/text communication channel in which the called party communicates using a text enabled client, and the calling party communicates using a voice-enabled client.

Technical advantages of particular embodiments of the present invention include a system and method for communicating messages in which a called party may be notified of an incoming call to a voice-enabled client of the called party, using a text-enabled client of the called party. Accordingly, a bridge is provided between traditional phone systems, and the evolving field of instant messaging (IM).

Another technical advantage of particular embodiments of the present invention includes a system and method for communicating messages, in which a called party receives a message from, and/or communicates with a calling party in real-time, as opposed to simply receiving a recorded message after the calling party leaves a message with a voicemail system associated with the called party. Accordingly, non-real-time communications are essentially converted to real-time communication between a calling party and a called party.

Yet another technical advantage of particular embodiments of the present invention includes a system and method for communicating messages in which a called party is given several options for communicating with a calling party. For example, if the called party is not available to conduct a two-way voice communication session using his work phone, the called party is given several different options for communicating with the calling party.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
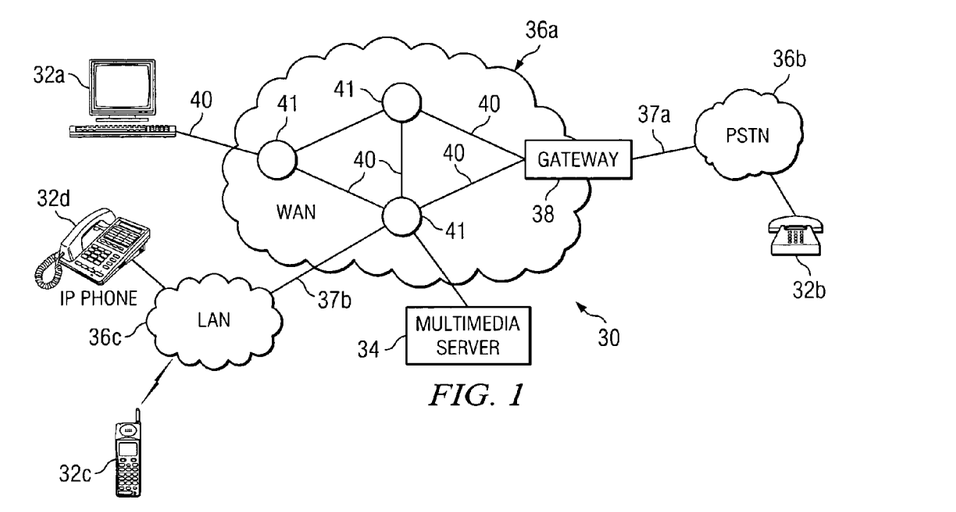
FIG. 1 illustrates a communication system including a plurality of endpoints operable to communicate among each other and a multimedia server, in accordance with a particular embodiment of the invention.

FIG. 1 illustrates a communication system 30 including a plurality of endpoints 32a-32d, each having the ability to establish communication sessions between each other and/or multimedia server 34, using one or more of communication networks 36a-36c. Such communications may be accomplished using any audio and/or video means, including signals, data or messages transmitted through voice devices, text chat, web sessions, facsimile, instant messaging and e-mail. Communication between endpoints and/or multimedia server(s) may also be made using dual tone multiple frequency (DTMF) signal, speech recognition, instant messaging (IM), short message service (SMS) text messaging or any other suitable method. For purposes of this specification the terms "client", "phone", "telephone" and/or "endpoint" may be used interchangeably to refer to any personal computer (PC), telephone, IP Phone, cellular, mobile or wireless phone, and/or any other device that has the ability to communicate audio, video, and/or text communications.

The teachings of the present invention provide a system and method for managing communication sessions between a text-based client and a voice-based client that provide a bridge between a traditional voicemail system and the evolving field of Instant Messaging (IM), allowing users of these systems to exchange information. Particular embodiments utilize presence detection to locate and/or communicate with a called party that is not otherwise available at a client (e.g., office telephone extension) associated with the called party.

For example, and in accordance with a particular embodiment of the present invention, a called party may receive a telephone call from a calling party, at the business office telephone of the called party. If the called party is not available to answer the call, a multimedia server may use presence detection to locate and notify the called party of the incoming call. In one embodiment, the multimedia server may send a text message to an IM client indicating that the call is being received. The text message may also include information about the calling party (e.g., the telephone number from which the calling party placed the call and/or the name of the person associated with the telephone number. Upon receipt of the text message, the called party may be given the option to, among other options: (i) transfer the calling party to voicemail, (ii) connect the calling party with the called party, at a different client (e.g., mobile telephone) to allow for a two-way voice communication; or (iii) connect the telephone of the calling party with a text-based client of the called party, to allow a hybrid voice/text communication session in which the multimedia server translates voice communications received from the calling party to text, and/or converts text communications received from the called party to voice.

In the illustrated embodiment, communication network 36a is a wide area network (WAN) that enables communication between a plurality of endpoints 32a-32d and multimedia servers 34 distributed across multiple cities and geographic regions. Communication network 36b is a public switched telephone network (PSTN) and couples endpoint 32b with communication network 36a through gateway 38. Communication network 36c is a local area network (LAN), which couples endpoints 32c and 32d with communication network 36a. Accordingly, users of endpoints 32a-32d can establish communication sessions between and among each network component coupled for communication with one or more of networks 36a-36c. Communication links 37a and 37b couple communication networks 36a and 36b, and communication networks 36a and 36c, respectively.

Communication network 36a includes a plurality of segments 40 and nodes 41 that couple endpoint 32a with multimedia server 34, gateway 38, and communication networks 36b-36c. Therefore, a user of endpoint 32a is provided with access to endpoints 32b-32d, and multimedia server 34. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, an intranet, extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or multimedia servers 34.

In a particular embodiment, communication network 36a employs voice communication protocols that allow for the addressing or identification of endpoints, nodes, and/or servers coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b may include switching stations, central offices, mobile telephone switching offices, pager switching offices, remote terminals, and/or other related telecommunications equipment that are located throughout the world. IP networks transmit data (including voice, text and/or video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, multimedia server 34, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, or any other devices capable of performing telephony functions over an IP network.

Technology that enables text-based communications may include technology associated with the evolving field of instant messaging. Instant messaging is essentially real-time, on-line electronic mail. Examples of such software include ICQ™, AOL Instant Messenger™ and Microsoft MSN Messenger™.

Components of communication system 30 may utilize session initiation protocol (SIP) technology in the transmission of audio, video or other data across the system. As a result, users of endpoints 32 may be identified by components of system 30 according to a uniform reference identifier (URI), such as a user's e-mail address, or other suitable identifier so that a user may be located, monitored and/or contacted through presence detection technology. The use of presence detection by components of system 30 enable the components to capture information about various communication devices, or endpoints, available to a user, and their status, such as whether a cellular phone is switched on or whether a user is logged into a personal computer (PC). The versatility of presence enables it to be used in both IP components, such as IP phone 32d, and other, non-IP components, such as components of PSTN 36b. For example, gateway 38 may comprise a SIP/PSTN gateway so that components coupled to PSTN 36b may utilize features and capabilities available through SIP technology.

It will be recognized by those of ordinary skill in the art that endpoints 32a-32d, multimedia server 34, and/or gateway 38 may be any combination of hardware, software, and/or encoded logic that provide communication services to a user. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, servers, segments, nodes, and gateways, communication system 30 contemplates any number or arrangement of such components for communicating media. Furthermore, any or all of the components illustrated as part of multimedia server 34 may be separate from multimedia server 34 and/or distributed locally or remotely from multimedia server 34.

Figure 2:
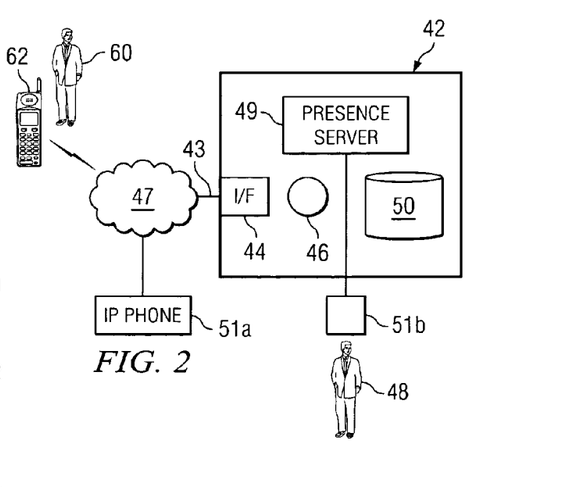
FIG. 2 illustrates an alternative embodiment communication system also having a multimedia server, and includes various components of the multimedia server, in accordance with another embodiment of the present invention.

FIG. 2 illustrates a multimedia server 42 in more detail, in accordance with a particular embodiment of the present invention. Multimedia server 42 may include the same components and operate in a similar manner to multimedia server 34 of FIG. 1, and vice-versa. Multimedia server 42 includes an interface port 44 which couples multimedia server 42 with a communication network 47, using segment 43. Communication network 47 may comprise one or more networks such as those described with respect to communication system 30 of FIG. 1.

In accordance with a particular embodiment of the present invention, a proxy is generated at the multimedia server on behalf of the called party. The called party may establish an IM connection with the proxy. The proxy communicates via TTS voice with the calling party, on behalf of the called party. The proxy may also control the call (transfer, conference in a third party, etc.) on behalf of the called party and in response to special commands issued to the proxy by the called party via its IM connection to the proxy.

Processor 46 may use a memory lookup, a database or other memory module, such as memory module 50, in determining how to distribute and/or process a call. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component.

Multimedia server 42 includes a presence server 49 that may be any combination of hardware, software and/or encoded logic. As further discussed below, in one embodiment presence server 49 utilizes SIP technology to detect and/or monitor the presence of a particular user (e.g., user 48) at an endpoint, (for example, at the user's PC, cell phone, IP phone or other device) and associate a call with a user's presence. Other non-SIP presence techniques known in the art may be used in other embodiments. To accomplish such functionality, presence server 49 may have access to any relevant information relating to or associated with the endpoints the user utilizes or accesses to communicate with the multimedia server.

It will be recognized by those of ordinary skill in the art that multimedia server 42 may include any number of processors or memory modules to accomplish the functionality and features described herein. The processors 46, memory modules 50 and/or presence server 49 associated with multimedia server 42 may be centrally located (local) with respect to one another, or distributed throughout communication network 47.

Furthermore, multimedia server 42 includes a voicemail system 64 that operates in conjunction with the telephony devices coupled to network 47, to receive and store voicemail messages for users of telephony devices, as well as for certain remote devices located outside of network 47. In various embodiments, voicemail system 64 may comprise a multimedia messaging system. Thus, the teachings of the present invention are not limited to messaging systems that handle voice only. As will be described below, the integration of telecommunication services into network 47 allows voicemail messages to be encrypted and stored in an open file system supported by network 47, for access by an authorized user for a variety of devices in network 47.

Voicemail system 64 receives messages for users that are unable to receive an incoming telephone call. Although illustrated as a dedicated network device, the software, firmware and/or hardware used to implement voicemail system 64 may be incorporated into one or more devices on network 47. Voicemail system software may be embodied in any type of computer-readable medium. The computer or other device on which the voicemail software is located includes a network interface, a memory or other computer-readable medium to store the software, and a processor to execute the software.

If a calling party (e.g., calling party 60) is unable to reach a user of a telephony device in network 47 (e.g., user 48), a call manager (or any other appropriate device) transfers the call to multimedia server 42 and/or voicemail system 64. Voicemail system 64 indicates to the caller that the user is not available to communicate with the caller and invites the caller to leave a voicemail message for the user. After receiving a message for the user, voicemail system 64 stores the message in a file system (e.g., as a ".wav" file). Such file systems may include a media storage device, such as a hard drive, diskette, CD-R, CD-RW, DVD-RAM, or any other modifiable storage device.

One advantage of a VoIP telecommunication system is that voicemail messages can be stored in "open" locations, such as the file system described above, that are accessible from devices in network 47, as well as devices coupled to network 47. A user may access a message stored in a file system from numerous devices in communication network 47 including, but not limited to, a telephony device or computer coupled to network 47. Therefore, there is much more interconnectivity between the location at which voicemail messages are stored and the potential locations from which a user may wish to access the messages.

In accordance with the teachings of the present invention, a call initiated by calling party 60 using a cell phone 62, intended for the office telephone 51a of called party 48, may be directed to multimedia server 42 if called party 48 is not available to receive the call using his office telephone 51a. The call may be directed to multimedia server 42 after a predetermined number of rings without an answer, or the called party may have previously configured his office telephone 51a to forward all calls to multimedia server 42, or the call may be forwarded to multimedia server 42 if the handset of phone 51a is offhook. It should be recognized by those of ordinary skill in the art that "transferring a call" to multimedia server 42 may include transferring control of the call or signaling associated with the call, or it may include establishing a communication channel or path between the calling party and multimedia server 42.

As described below, control of the call and/or signaling associated with the call may be transferred to multimedia server 42 to allow the called party several options for handling the call. In accordance with particular embodiments, multimedia server 42 may use presence detection to "locate" called party 48. In one embodiment, multimedia server 42 may be configured to detect the "presence" of called party 48 for example, if called party 48 is presently logged onto his home computer, using his cell phone, sending or receiving messages from an Instant Messaging client, or using a personal digital assistant (PDA) with which presence server 49 has the ability to detect and/or communicate with. It will be recognized by those of ordinary skill in the art that endpoints 51a, 51b, and 62 may be any type of endpoint described within this specification, and that any particular user (e.g., user 48 and/or user 60) may have one or more endpoints with which they are associated and/or use.

In the illustrated embodiment, user 60 has access to, and is associated with, endpoints 51a and 51b. Endpoint 51a is an office phone, and endpoint 51b may be one or more of a home phone, PC, cell phone, IP phone and/or PDA.

In particular embodiments, user 48 may desire to be notified when a call is received at a phone associated with user 48 (e.g., office phone 51a and/or endpoint 51b). Thus, user 48 is notified about any call received at his office phone 51a, as the call is received and while the office phone is ringing. Such notification may be received by user 48 at endpoint 51b.

In accordance with another embodiment, as the call is being received at multimedia server 42, multimedia server 42 may send a voice call, instant message, SMS text message and/or other type of message to the user's phone or other associated endpoint, such as a PDA or PC, informing user 48 that a call is being received. Using the presence information of the user, multimedia server 42 is able to find the endpoint or device via which the user is available, and send the notification to this device. In response, user 48 may call multimedia server 42 and may be identified by presence server 49 by his presence on the phone or other device. In particular embodiments, multimedia server 42 may notify the user through IM or SMS text messaging to a cell phone, that a call is being received and may invite the user to call into multimedia server 42.

User 48 may move freely between various endpoints during the course of the day, such as the user's office phone, cell phone and home phone, re-establishing his presence on any desired endpoint. The presence on the new device is recognized by multimedia server 42, and the user is associated with his presence. Using this association, the call and the IM or other notification messages may be routed to user 48 while freeing the user to roam freely between his endpoint devices. In one embodiment, the system may send multiple identical notifications to a given user; for example, one may be sent to the user's SMS connection and another to the user's IM connection.

Figure 3:
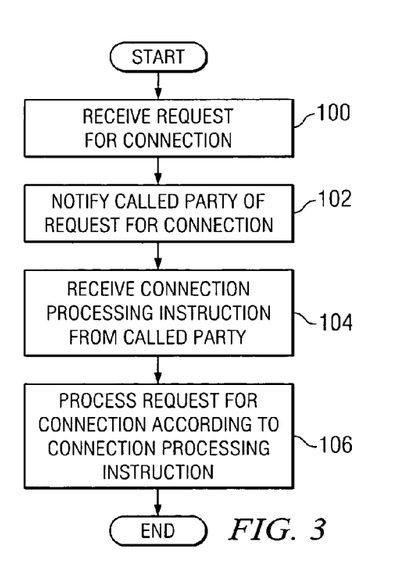
FIG. 3 illustrates a method for communicating messages between a voice-based client and a text-based client, in accordance with yet another embodiment of the present invention.

FIG. 3 illustrates a method for communicating messages, in accordance with a particular embodiment of the present invention. The method begins at step 100, where a request for connection with a called party (e.g., user 48) associated with a second client (e.g., IP Phone 51a) is received from a calling party (e.g., user 60) associated with a first client (e.g., endpoint 62). For example, the calling party may be using a telephone to place a telephone call to a called party, while the called party is away from his office. In the past, this would typically result in the calling party being transferred to a voicemail system associated with the called party. The calling party would have the option to leave a message, or hang up. In either case, the called party would not be aware that the calling party was attempting to reach him, unless and until the called party checked his voicemail for messages, and/or received a caller ID history of incoming calls.

In accordance with the present invention, the called party may be notified that a request for connection (e.g., a telephone call) has been received, while the calling party is still on the line. For example, the called party may be "logged on" to a presence server, and the presence server may know how to reach the called party, using a third client (e.g., endpoint 51b), other than the office phone of the called party. In accordance with a particular embodiment of the present invention, the third client may be a text enabled client (e.g., an Instant Messaging client) of the called party. In this embodiment, the presence server may transmit a message to the called party that a calling party is trying to contact the called party, quickly after the request for connection is received. For example, while the calling party is still listening to ring tones, the presence server may notify the called party of the telephone call, using a text message transmitted to the third client.

In accordance with a particular embodiment of the present invention, the called party may receive a message that an incoming call was received at the called party's work telephone. In another embodiment, the message may include the telephone number of the calling party, to give the called party an idea of the identity of the calling party. In still another embodiment, the message may include the name of the person or organization associated with the first client. Such information may be obtained using "Caller ID" type information recorded by the telephone network operator (e.g., telephone company). Alternatively, the presence server may use the telephone number of the calling party to find the identity of the calling party by searching stored contacts of the called party (e.g., a Microsoft Outlook™ account of the called party) or a directory (e.g., Microsoft Active Directory™).

Accordingly, soon after the telephone call is received, and while the calling party is listening to ring tones (and unaware that the called party is away from his office) the called party may receive a message, such as "a call from Joe Smith (214) 555-1212 is being received at your work telephone." In response to this message, the called party may be given the opportunity to provide connection processing instructions to the presence server. For example, using DTMF keys of the third client, the called party may instruct the presence server regarding how to process the request for connection.

In accordance with a particular embodiment of the present invention, the called party may be given several options for processing the request for connection. One option may be to simply allow the calling party to be transferred to the voicemail account of the called party. The called party may use this option if the called party is involved in an important meeting, or if the called party does not desire to communicate with the calling party (perhaps based upon the identity of the calling party) at that time.

The called party may also be given the option to transfer the calling party to another voice enabled client of the called party. For example, the called party may instruct the presence server to connect the calling party with a cell phone of the called party. Similarly, since many devices available today include both text and voice message capabilities, the called party may instruct the presence server to establish a voice connection between the first client and the third client. This feature allows the called party to selectively intercept and reroute calls intended for his work telephone, to another device, or client, of the called party.

In accordance with a particular embodiment of the present invention, the called party may use an IM device to issue call control commands that govern the routing of the incoming call. In this embodiment, multimedia server 42 includes a bridge/translator that receives text commands from the called party regarding the desired treatment of the call. The bridge in multimedia server 42 translates these text commands to the specific call control protocol used in the system (e.g., SIP, H.323, ISDN, etc.) and uses these commands to control the routing of the call.

Accordingly, the called party establishes IM communication with a proxy of the multimedia server. The proxy communicates on behalf of the called party. The proxy may also establish a voice communication path between the calling party and the proxy. The called party may also use the proxy to control the call, using IM. The called party may use a particular indicator to notify the proxy that a call processing instruction will follow. In accordance with a particular embodiment, the indicator may be a "!c" typed at the beginning of an IM, that indicates a call processing instruction will follow.

The called party may also be given the opportunity to establish a text connection with the calling party. For example, if the called party is attending a meeting or seminar, and a voice conversation is not practical, the called part may instruct the presence server to allow the called party to communicate using text messaging. In this embodiment, the calling party may still communicate using voice communication (i.e., a hybrid voice/text communication session), or the calling party may elect to communicate with the called party using a two-way text communication path, if the first client is text enabled.

Assuming that the first client is a standard POTS telephone without text messaging capability, a multimedia server may use text-to-speech (TTS) and/or speech-to-text (STT) to accommodate a communication session between the calling party and the called party.

If the called party instructs the presence server that the called party would prefer to communicate using text messaging, the presence server may notify the calling party that the calling party is only available to communicate using text, and the presence server may give the option to the calling party to communicate using text or voice. If the calling party elects to use voice, the presence server may act as an intermediary, and: (i) translate text received from the called party to speech, and play the speech over the telephone of the calling party; and/or (ii) translate speech received from the calling party to text, and display such text to the called party. In this embodiment, the calling party may be advised to speak slowly to facilitate the recognition of the spoken message by the STT.

An embodiment is also envisioned wherein the called party may elect to listen to the voice of the calling party (if the third client is able to play voice communications), but respond using text. This scenario may be used where the calling party is in a meeting, but has a text messaging client with voice capabilities, and the called party can discreetly listen to the calling party using, for an example, an earpiece.

At step 104, the connection processing request is received from the called party. As discussed above, the connection processing request may be one or more of a number of alternatives selected by the called party. Although all such alternatives cannot be described fully herein, a list of representative examples are described below, and include:

Transfer the calling party to voicemail.

Transfer the calling party to voicemail, and convert the contents of any voicemail to text and transmit the text to the third client approximately in real-time.

Transfer the calling party to voicemail, convert the voicemail to text, and transmit the text message to the third client after the calling party disconnects.

Establish a two-way voice connection between the first client and a third client.

Establish a two-way voice connection between the first client and another client selected by the called party.

Establish a hybrid voice/text communication channel in which the called party listens to voice communications of the calling party, but responds using text.

Establish a hybrid voice/text communication channel in which the called party receives voice messages converted to text, and the called party responds using text.

Receive, on the third client, an IM alert regarding a call from the first client to the second client. Use the third client to redirect the call to a fourth client. This embodiment allows the called party to use the IM to communicate via hybrid voice/text with the calling party. Then the IM is used to redirect the call to another endpoint. One aspect of this embodiment is the fact that the called party can use the IM for communication to the called party and to the multimedia server. For example, by starting a line with a special tag "!c" it signifies to the IM server that this line is a command for the multimedia server rather than a message that needs to be TTS to the called party.

Establish a hybrid voice/text communication channel with the calling party. In this embodiment, the calling party communicates using voice. The multimedia server receives the voice of the calling party, and coverts it to text, then delivers the text message to the called party. The called party responds using text. The multimedia server converts the text to speech, and delivers the voice message to the calling party.

Next, at step 106, the presence server processes the request for connection in accordance with the connection processing instruction received from the called party. Assuming that the calling party is communicating using a POTS telephone, and the called party elects to receive and transmit text messages only, the communication session may proceed as described immediately below.

After notifying the calling party that the called party will communicate using text, the presence server may solicit a message from the calling party. The presence server may receive the voice message from the calling party, convert it to a text message, and deliver the text message to the called party, approximately in real-time (taking into account the time it takes to receive, convert to text, and transmit the text to the third client).

While the called party is receiving the converted text message, or shortly after receiving the entire text message, the called party may begin typing a response. In a particular embodiment of the present invention, the presence server may receive the text message response from the called party, approximately in real-time. In this embodiment, the multimedia server may be configured to convert the text message to speech, and transmit the message to the calling party as it is being received, approximately in real-time. In another embodiment, the multimedia server may transmit converted voice messages to the calling party only as full sentences or full paragraphs are received from the calling party. In yet another embodiment, the multimedia server may transmit the converted voice message to the calling party, only after receiving an indication from the called party that the response is complete.

In yet another embodiment, the text message from the called party will not be delivered to the multimedia server until the called party is complete with the response. In this embodiment, the called party will be allowed to type, modify and/or edit the response, and send the text message to the multimedia server when it is complete. In this manner, it may be similar to typing a response to a text message or email, and pressing "send" when the message is complete.

In accordance with a particular embodiment of the present invention, the multimedia server may be configured to enhance the converted voice message before it is delivered to the calling party. For example, depending upon whether the called party is male or female, the multimedia server may incorporate feminine or masculine characteristics, respectively, into the voice message that is delivered to the calling party. In another embodiment, the multimedia server may include a database that stores voice characteristics associated with the called party, to allow the converted voice message to approximately mimic the called party's voice. This feature lends more authenticity to the voice message that is transmitted to the calling party. The voice characteristics stored by the multimedia server may be sophisticated voice spectrum characteristics that allow the presence server to approximately reproduce the voice, tones, and/or inflection common to the voice communications of the called party. Sophisticated software associated with the multimedia server may also be used to generate authentic tones and voice inflections based upon punctuation, words and other content associated with the text message received from the called party.

In accordance with another embodiment of the present invention, the calling party may be provided with the ability to convey messages to a text-based client of the called party, using DTMF keys. Accordingly, a user of any telephone, including POTS telephones may communicate text, numeric, and/or voice communications to a called party that is using a text-based client.

The teachings of the present invention further allow a called party to employ rule-based logic to define the interaction of the calling party, and a text-based client of the called party. For example, the called party may predefine his interaction with a multimedia server and/or the interaction between the calling party and the multimedia server. In one embodiment, the called party and/or an administrator of the multimedia server may configure the multimedia server to handle particular communications in a particular manner. If an urgent message is received for the called party, the message may be automatically forwarded to the called party, or the called party may be notified as the urgent message is being received. In this embodiment, all non-urgent messages may simply be forwarded to a voicemail account or handled otherwise.

In a similar manner, the called party and/or the administrator may configure the multimedia server to locate and notify the called party, and/or forward messages intended for the called party, to the called party, only if the message is received from a predetermined list of individuals. In this example, the called party may configure the multimedia server to notify the called party if a message is received (or is being received) from the called party's wife or other family member, supervisor at work, and/or any other individual that the called party would like to have "priority" in the handling of requests for connections and/or messages intended for the called party.

Existing voicemail systems often ask the calling party to specify the priority of a message after the message has been recorded. In accordance with the teachings of the present invention, and in order to facilitate the rule-based logic discussed above, the system of the present invention may prompt the caller to specify the priority of the message, as or soon after the request for connection is received (but before the message is completed), such that the rule-based logic discussed above may be employed for determining how to process the incoming request for connection and/or associated messages from the calling party.

It will be recognized by those of ordinary skill in the art that the teachings of the present invention are not limited to requests for connection and/or messages received from voice-enabled clients, only. For example, the multimedia server may be configured to receive electronic mail messages intended for the called party. The electronic mail messages may be converted to voice, and delivered to a voice-based client of the called party. Alternatively, if the called party is in possession of a text-based client, the electronic mail message may be forwarded to such client. In order to accommodate the rule-based logic discussed above, the multimedia server may take into account a "priority" of the e-mail message (e.g., urgent, or non-urgent). Furthermore, the multimedia server may take into account the sending party of the electronic mail message, in order to determine whether or not to alert the called party of the message and/or deliver the message (in voice and/or text format) to the called party.

In accordance with the teachings of the present invention a system and method are provided whereby a voicemail system may be enhanced with a presence proxy, for its user community. Another example of the operation of such a system is described more fully below.

A caller from any phone calls a person who is away from his office. The caller is transferred to the enterprise voicemail system that plays the typical prompt "Hello, this is Joe. I'm away from the office, please leave a message at the sound of the beep". While the prompt is being played, a presence proxy server determines if Joe is logged on to an IM enabled device. If Joe is not logged on to such a device, the system continues to record a voicemail message for Joe.

However, if Joe is logged-on to an IM device, a connection (as detailed below) is established between the caller and Joe's IM system, enabling Joe and the caller to exchange information. Joe's corporate directory helps resolve the mapping between Joe's extension and his IM address/user name.

In accordance with a particular embodiment, when a voicemail message is left for Joe, it is translated into text using speech recognition and rendered to Joe's IM client. In another embodiment, the caller can enter his callback number via DTMF keys. In another embodiment, the system may use rule-based script, and decide to establish voice connectivity between the voicemail server and Joe's IM device.

The rules may be based on caller ID information, the capabilities of Joe's IM device (e.g. whether it is voice enable), or Joe's willingness to engage in a voice call at any particular time. For example, a user in a meeting may be willing to engage in a text IM messaging and not in a voice communication.

In yet another embodiment, the caller is queried whether the message is urgent, and the IM server is invoked only to convey urgent messages. This option can be configured as one of the rules described above.

If Joe elects to communicate via text, the voice messaging system utilizes a TTS server to convey his message to the caller. To make the communication more authentic, the system stores Joe's voice characteristics in the directory. These parameters are applied to Joe's TTS session at the TTS server and help convey Joe's message to the caller with Joe's simulated voice.

In yet another embodiment, the integration between the multimedia server and the IM proxy is used to expedite the delivery of urgent voicemail messages to end users. In this embodiment, the system exploits the fact that users are not always logged-on to their electronic mail, but are typically logged-on to their IM device. In this scenario, as the user receives an urgent e-mail, the multimedia server invokes the IM proxy to determine if the user is logged-on to his IM client.

If he is, an IM is sent to him alerting him that he has received an urgent e-mail. Similar to the aforementioned embodiment, the system can use script-based logic to enable the user to receive alerts when an e-mail from a specific person or regarding a specific topic, arrives at his multimedia server.

In yet another embodiment, the proxy server is invoked as soon as the phone rings, before the call is transferred to the multimedia server. This makes it possible for Joe to be notified of an incoming call via IM, and he can then decide whether or not to take the call via IM or let it roll over to the voicemail system.

Accordingly, the system and method of the present invention provide a means to convert different types of media into IM messages (and IM messages to multimedia communication) based on presence detection and a set of pre-defined rules that govern the behavior of intercepting incoming media and notifying the recipient. Also, means are provided for utilizing presence information and IM to alert users of incoming calls (ring via IM) and control/direct the flow of incoming calls. Accordingly, the user's availability to different forms of communication while on IM is increased.

The teachings of the present invention also provide a system and method for accommodating real-time communication between a voicemail system and a calling party, and between the voicemail system and the called party. Typically, voicemail systems do not communicate anything other than a prerecorded message to either of the calling party, or the called party. In accordance with the present invention, the voicemail system is communicating real-time (approximately) information to the calling party (e.g., information received from the calling party), and communicating real-time (approximately) information to the called party (e.g., information received from the calling party).

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30, these elements may be combined, rearranged or positioned in order to accommodate particular routing architectures or needs. In addition, any of these elements may be provided as separate external components to communication system 30 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for communicating messages, comprising:
receiving over a first communication link, from a first client associated with a calling party, a request for connection with a second client associated with a called party;
using presence detection to monitor the availability of the called party at a text enabled third client associated with the called party;
determining called party communication instructions for notifying the called party of incoming calls based upon rule-based logic for defining interaction between the calling party and the text enabled third client, wherein the rule-based logic is stored in a database prior to receipt of the request for connection;
notifying the called party over a second communication link using the third client that the request for connection was received, in response to receiving the request for connection, while the calling party is still connected to the first communication link;
receiving a connection processing instruction from the third client, in response to the called party being notified over a second communication link using the third client that the request for connection was received; and
processing the request for connection in accordance with the connection processing instruction.

2. The method of claim 1, wherein the connection processing instruction comprises an instruction from the called party to transfer the calling party to a voicemail messaging system associated with the called party.

3. The method of claim 1, wherein the connection processing instruction comprises an instruction from the called party to transfer the calling party to the third client to establish a communication channel between the first client and the third client.

4. The method of claim 1, wherein the connection processing instruction comprises an instruction from the called party to establish a communication channel between the first client and a fourth client.

5. The method of claim 3, wherein the communication channel comprises a two-way voice communication path between the first client and the third client.

6. The method of claim 1, wherein the connection processing instruction comprises an instruction from the called party to transfer the calling party to a voicemail account of the called party, and further comprising:
transferring the calling party to the voicemail account;
converting the contents of any voicemail message left by the calling party to text; and
transmitting the text to the third client.

7. The method of claim 6, wherein the text is transmitted to the third client approximately in real-time as the calling party leaves the voicemail message.

8. The method of claim 6, wherein the text is transmitted to the called party after the calling party is complete with the voicemail message.

9. The method of claim 1, further comprising establishing a hybrid voice/text communication channel in which the called party listens to voice communications from the calling party, and responds to the calling party using text messages.

10. The method of claim 1, further comprising establishing a hybrid voice/text communication channel in which the called party receives voice messages from the calling party that have been converted to text, and the called party responds to the calling party using text.

11. The method of claim 1, further comprising:
notifying the calling party that the called party will communicate with the calling party using a text messaging enabled client;
receiving voice communication from the first client;
converting the voice communication to text; and
communicating the text to the text messaging enabled client.

12. The method of claim 11, wherein the third client comprises the text messaging enabled client.

13. The method of claim 11, further comprising:
receiving at least a first text response to the voice communication;
converting the first text response to a speech message; and
communicating the speech message to the first client.

14. A method for communicating messages, comprising:
receiving over a communication link, from a first client associated with a calling party, a request for connection with a second client associated with a called party;
using presence detection to monitor the availability of the called party at a text enabled third client associated with the called party;
determining called party communication instructions for notifying the called party of incoming calls based upon rule-based logic for defining interaction between the calling party and the text enabled third client, wherein the rule-based logic is stored in a database prior to receipt of the request for connection;
notifying the called party using the third client that the request for connection was received, in response to receiving the request for connection, while the calling party is still connected to the communication link;
receiving a connection processing instruction from the third client, in response to the called party being notified using the third client that the request for connection was received;
processing the request for connection in accordance with the connection processing instruction; and
transmitting, to the first client, a request for the calling party to assign a level of importance to the first request for connection prior to receiving a message from the calling party that is intended for the called party.

15. The method of claim 14, wherein the level of urgency is selected from a group including an urgent designation and a non-urgent designation.

16. The method of claim 15, further comprising transmitting the level of urgency selected by the calling party, to the called party.

17. The method of claim 14, wherein the level of importance is used in a rule-based system to determine whether to forward the message to the called party.

18. The method of claim 13, further comprising:
determining at least one voice characteristic based upon an identity of the called party; and
incorporating the at least one voice characteristic into the speech message.

19. The method of claim 18, wherein the at least one voice characteristic is selected from a group including a male voice tone and a female voice tone.

20. The method of claim 18, wherein the at least one voice characteristic includes a voice spectrum associated with the called party, wherein the at least one voice characteristic is used to allow the speech message to approximately mimic the speaking voice of the called party.

21. The method of claim 1, further comprising transmitting, to the called party, information regarding the request for connection.

22. The method of claim 21, wherein the information regarding the request for connection includes a telephone number of the first client.

23. The method of claim 21, wherein the information regarding the request for connection includes a name of the calling party.

24. The method of claim 22, wherein the information regarding the request for connection includes a priority assigned to the request for connection.

25. A method for communicating messages, comprising:
receiving over a first communication link, from a first client, a message intended for a second client associated with an intended recipient;
using presence detection to monitor the availability of the intended recipient at a text enabled third client associated with the intended recipient;
determining called party communication instructions for notifying the intended recipient of incoming calls based upon rule-based logic for defining interaction between the calling party and the text enabled third client, wherein the rule-based logic is stored in a database prior to receipt of the request for connection;
notifying the intended recipient over a second communication link, via Instant Messaging, using the third client, that the message has been received and stored;
wherein the message comprises an electronic mail text message.

26. A system for communicating messages, comprising:
an interface being operable to receive over a first communication link, from a first client associated with a calling party, a request for connection with a second client associated with a called party;
a multimedia server being operable to use presence detection to monitor the availability of the called party at a text enabled third client associated with the called party;
the multimedia server being operable to determine called party communication instructions for notifying the called party of incoming calls based upon rule-based logic for defining interaction between the calling party and the text enabled third client, wherein the rule-based logic is stored in a database prior to receipt of the request for connection;
the multimedia server being operable to notify the called party over a second communication link using the third client that the request for connection was received, in response to receiving the request for connection, while the calling party is still connected to the first communication link;
the multimedia server being further operable to receive a connection processing instruction via Instant Messaging from the third client, in response to the called party being notified over a second communication link using the third client that the request for connection was received; and
a processor being operable to process the request for connection in accordance with the connection processing instruction.

27. The system of claim 26, wherein the processor is further operable to establish a communication channel between the first client and the third client.

28. The system of claim 27, wherein the processor comprises a bridge between first and second distinct communication modalities, the first modality being voice and including voice protocols, the second modality being Instant Messaging and including Instant Messaging protocols.

29. The system of claim 27, wherein the communication channel comprises a two-way voice communication path between the first client and the third client.

30. The system of claim 26, further comprising:
the multimedia server being further operable to notify the calling party via Instant Messaging that the called party will communicate with the calling party using a text-messaging enabled client;
the interface being further operable to receive voice communication from the first client;
the processor being further operable to convert the voice communication to text; and
the multimedia server being further operable to communicate the text to the text messaging enabled client.

31. The system of claim 30, further comprising:
the multimedia server being further operable to receive at least a first text response to the voice communication;
the processor being further operable to convert the first text response to a speech message; and
the interface being further operable to communicate the speech message to the first client.

32. The system of claim 26, wherein the interface is further operable to transmit, to the first client, a request for the calling party to assign a level of urgency to the first request for connection.

33. The system of claim 32, wherein the multimedia server is further operable to transmit the level of urgency selected by the calling party, to the called party.

34. The system of claim 31, further comprising:
a database being operable to store a plurality of voice characteristics;
wherein the processor is further operable to determine at least one voice characteristic based upon an identity of the called party; and
wherein the processor is further operable to incorporate the at least one voice characteristic into the speech message.

35. The system of claim 26, wherein the processor is further operable to determine called party communication instructions for processing incoming calls based upon rule based logic for defining interaction between the calling party and a text-enabled client of the called party; and
a database being operable to store the rule based logic prior to receipt of the request for connection.

36. The system of claim 26, wherein:
the multimedia server is further operable to receive a call processing instruction from the called party, after a first communication connection is established between the calling party and the called party; and
the processor is further operable to execute the call processing instruction.

37. The system of claim 36, wherein the call processing instruction comprises a request from the called party to transfer the communication connection to a fourth client, and the processor is further operable to establish a second communication connection between the first client and the fourth client.

38. A system for communicating messages, comprising:
an interface being operable to receive over a first communication link, from a first client, an electronic mail text message text message intended for a second client associated with an intended recipient;
a multimedia server being operable to use presence detection to monitor the availability of the intended recipient at a text enabled third client associated with the intended recipient;
the multimedia server being operable to determine called party communication instructions for notifying the intended recipient of incoming calls based upon rule-based logic for defining interaction between the calling party and the text enabled third client, wherein the rule-based logic is stored in a database prior to receipt of the request for connection; and
a multimedia server being operable to notify the intended recipient over a second communication link, via Instant Messaging, using the third client, that the electronic mail text message has been received and stored.

39. A system for communicating messages, comprising:
means for receiving over a first communication link, from a first client associated with a calling party, a request for connection with a second client associated with a called party;

means for using presence detection to monitor the availability of the called party at a text enabled third client associated with the called party;
means for determining called party communication instructions for notifying the called party of incoming calls based upon rule-based logic for defining interaction between the calling party and the text enabled third client, wherein the rule-based logic is stored in a database prior to receipt of the request for connection;
means for notifying the called party over a second communication link, via Instant Messaging, using the third client, that the request for connection was received, in response to receiving the request for connection, while the calling party is still connected to the first communication link;
means for receiving a connection processing instruction from the third client, in response to the called party being notified over a second communication link using the third client that the request for connection was received; and
means for processing the request for connection in accordance with the connection processing instruction.

40. The system of claim 38, further comprising:
means for notifying the called party that the called party will communicate with the calling party using a text messaging enabled client;
means for receiving voice communication from the first client;
means for converting the voice communication to text; and
means for communicating the text to the text messaging enabled client.

41. The system of claim 40, further comprising:
means for receiving at least a first text response to the voice communication;
means for converting the first text response to a speech message; and
means for communicating the speech message to the first client.

42. The system of claim 39, further comprising:
means for transmitting, to the first client, a request for the calling party to assign a level of urgency to the first request for connection.

43. The system of claim 41, further comprising:
means for determining at least one voice characteristic based upon an identity of the called party;
means for incorporating the at least one voice characteristic into the speech message; and
wherein the at least one voice characteristic includes a voice spectrum associated with the called party, and wherein the at least one voice characteristic is used to allow the speech message to approximately mimic the speaking voice of the called party.

44. A system for communicating messages, comprising:
means for receiving over a first communication link, from a first client, an electronic mail text message intended for a second client associated with an intended recipient;
means for using presence detection to monitor the availability of the intended recipient at a text enabled third client associated with the intended recipient;
means for determining called party communication instructions for notifying the intended recipient of incoming calls based upon rule-based logic for defining interaction between the calling party and the text enabled third client, wherein the rule-based logic is stored in a database prior to receipt of the request for connection; and means for notifying the intended recipient over a second communication link, via Instant Messaging, using the third client, that the electronic mail text message has been received and stored.

45. Software embodied in a non-transitory computer-readable storage medium, the computer-readable storage medium comprising code operable to:

receive over a first communication link, from a first client associated with a calling party, a request for connection with a second client associated with a called party;

use presence detection to monitor the availability of the called party at a text enabled third client associated with the called party;

determine called party communication instructions for notifying the called party of incoming calls based upon rule-based logic for defining interaction between the calling party and the text enabled third client, wherein the rule-based logic is stored in a database prior to receipt of the request for connection;

notify the called party over a second communication link, via Instant Messaging, using the third client, that the request for connection was received, in response to receiving the request for connection, while the calling party is still connected to the first communication link;

receive a connection processing instruction from the third client, in response to the called party being notified over a second communication link using the third client that the request for connection was received; and process the request for connection in accordance with the connection processing instruction.

46. The medium of claim 45, wherein the code is further operable to:

receive voice communication from the first client;
convert the voice communication to text; and
communicate the text to the text-messaging enabled client.

47. The medium of claim 46, wherein the code is further operable to:

receive at least a first text response to the voice communication;
convert the first text response to a speech message; and
communicate the speech message to the first client.

48. Software embodied in a non-transitory computer-readable storage medium, the computer-readable storage medium comprising code operable to:

receive over a first communication link, from a first client, an electronic mail text message intended for a second client associated with an intended recipient;

use presence detection to monitor the availability of the intended recipient at a text enabled third client associated with the intended recipient;

determine called party communication instructions for notifying the intended recipient of incoming calls based upon rule-based logic for defining interaction between the calling party and the text enabled third client, wherein the rule-based logic is stored in a database prior to receipt of the request for connection; and notify the intended recipient over a second communication link, via Instant Messaging, using the third client, that the message has been received and stored.

49. The method for communicating messages of claim 1, wherein the first communication link between the first client and the second client is inactive prior to receiving the request for connection.

* * * * *